Feb. 22, 1949.  W. B. MEATH  2,462,413
PRODUCTION OF FORMALDEHYDE
Filed June 6, 1946
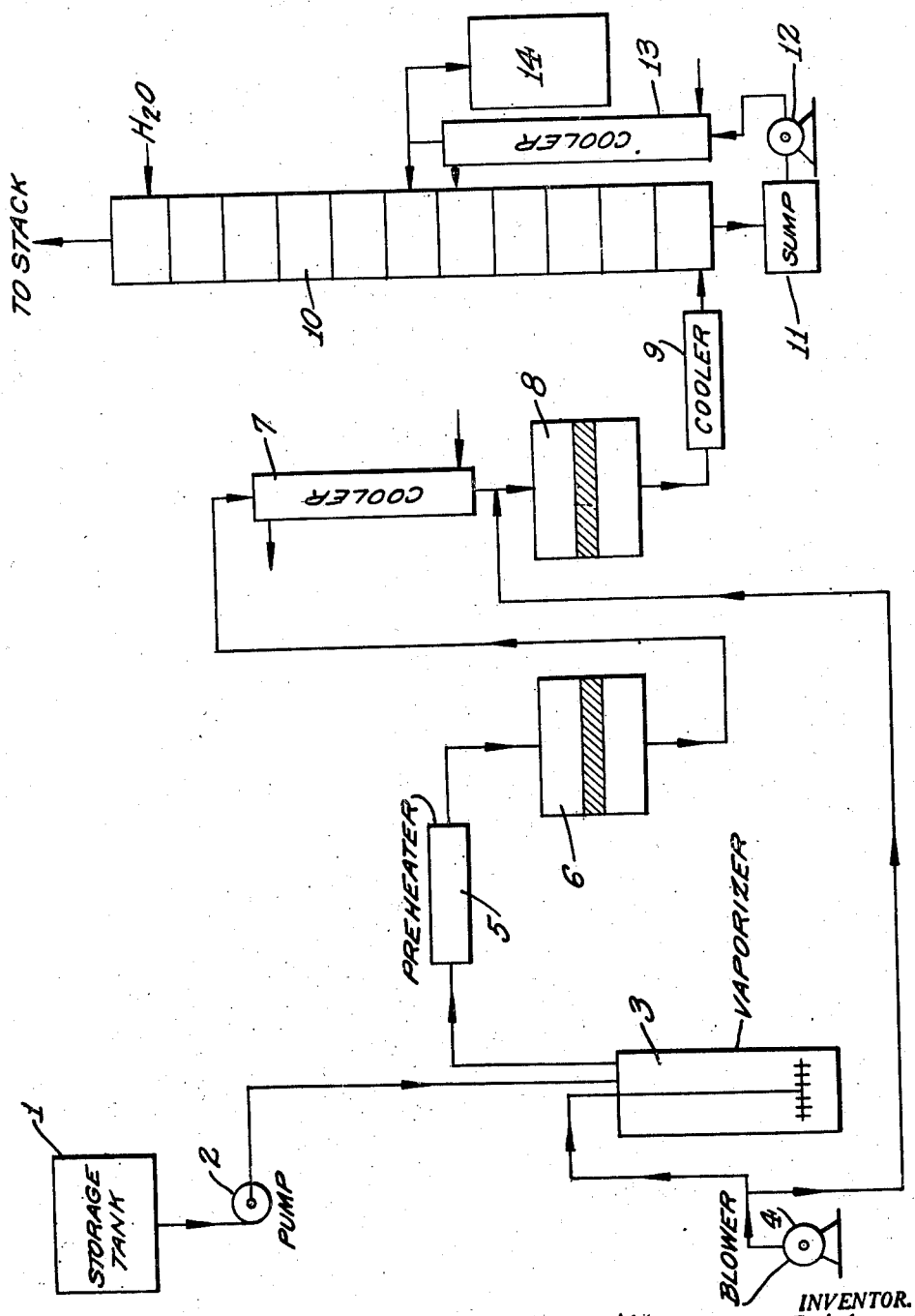
INVENTOR.
WILLIAM B. MEATH
BY Robert B Clark
ATTORNEY Patented Feb. 22, 1949

2,462,413

UNITED STATES PATENT OFFICE 2,462,413

PRODUCTION OF FORMALDEHYDE

William B. Meath, Syracuse, N. Y., assignor to Allied Chemical & Dye Corporation, a corporation of New York Application June 6, 1946, Serial No. 674,676

5 Claims. (Cl. 260—603)

This invention relates to improvements in the oxidation of methanol to formaldehyde.

Formaldehyde may suitably be produced by catalytic oxidation of methanol with air or other oxygen-containing gas. In carrying out this oxidation it has been found important to control the temperature thereof so that it does not exceed 700° C., since at temperatures above this value the formaldehyde product tends to decompose to carbon monoxide and hydrogen, or to be oxidized to carbon dioxide and water. The oxidation of methanol has been carried out using tubular reactors in which heat is removed to assist in control of the catalyst temperature. This method, while producing satisfactory yields of formaldehyde, requires use of relatively large heat exchange surfaces per unit of production and, as a result, these units are relatively expensive. When avoiding this expense by approaching adiabatic conditions, the primary factor controlling the temperature of the oxidation is the ratio of methanol to air; accordingly, in the practice of this embodiment of the oxidation it has been the custom to limit the ratio of methanol to air in order to avoid temperatures above about 700° C. and to minimize loss of product. A corollary of this practice, however, has been that the percent attack of the methanol has been lower than desirable, being of the order of 40% to 55%, so that yields of formaldehyde, based on the methanol, have also been low; the product of such process, therefore, contains considerable quantities of unreacted methanol and it has been found necessary to strip the product of the excess methanol to form the commercial formalin solution and to recycle the methanol removed in order to render the process economically attractive.

It is an object of this invention to provide a process which permits oxidation of methanol to formaldehyde to be accomplished in adiabatic reactors so as to obtain a high percent attack on the methanol without substantial decomposition of the formaldehyde product.

In accordance with this invention a mixture of methanol and an oxygen-containing gas is contacted with a catalyst in the first of two adiabatic reactors arranged in series, the mol ratio of oxygen to methanol being not greater than about 0.26; under these conditions partial oxidation of the methanol to formaldehyde occurs with substantially complete utilization of the oxygen reactant without the development of temperatures in excess of 700° C. The gases emerging from this reactor are then cooled to temperatures between about 125° and about 300° C. and admixed with additional oxygen-containing gas, the amount of additional oxygen-containing gas introduced being such that the mol ratio of total oxygen employed to methanol is between about 0.3 and about 0.5. The cooled, fortified mixture is then contacted with a catalyst in the second of the adiabatic reactors, wherein oxidation of the methanol to formaldehyde is completed. By interposing the cooling step between the reactors and adding additional oxygen-containing gas to the cooled products of the first reactor in the amounts specified, I have found that high percent attacks of methanol of the order of 70% to 94% may be achieved without, however, developing temperatures over 700° C. in either reactor, so that decomposition or oxidation of the formaldehyde product is avoided; as a result not only is the desired high percent attack on the methanol accomplished but also high yields of formaldehyde of the order of 85% to 95% based on the methanol attacked are attained, with the result that the reaction gases from the second reactor may be scrubbed directly for production of a commercial Formalin product without subsequent removal of unreacted methanol.

It is surprising that the process of my invention accomplishes the above highly desirable results in view of the known tendency of formaldehyde to be oxidized or decomposed in contact with catalysts in the presence of excess oxygen. It would have been expected that the addition of excess oxygen to the gases entering the second reactor would have resulted in extensive decomposition or oxidation of the formaldehyde product in that reactor; in actual practice such has been found to be the case if the gases from the first reactor are not first cooled to a temperature between about 125° and about 300° C. It will be seen, therefore, the interposition of a cooling step between the first and second reactors constitutes an important feature of my invention, which, in combination with other steps recited above, permits the highly advantageous results above set forth to be attained.

The catalyst employed in accordance with the process of my invention may be any catalyst suitable for oxidation of methanol to formaldehyde. Preferably a silver catalyst deposited on a suitable support such as pumice, "Alusite" (an alumina-silica refractory) or "Alundum" and containing between about 0.5% and about 10.0% by weight of silver is used. It is to be understood, however, catalysts such as copper, platinum, gold and copper-silver may be employed in place of silver.

The accompanying drawing diagrammatically illustrates the process of my invention. As shown in the drawing methanol is pumped from storage tank 1 by pump 2 to vaporizer 3; air is blown by blower 4 through the distributor in vaporizer 3 thereby forming a vapor mixture of methanol and air, which passes from vaporizer 3 to preheater 5. In accordance with this invention the mol ratio of oxygen to methanol in the gas mixture passed to preheater 5 should be not greater than about 0.26, so that the flow of air from blower 4 to vaporizer 3 is adjusted so that the mol ratio of air to methanol in the mixture produced in vaporizer 3 is not more than about 1.25, preferably between about 0.7 and about 1.25. This mixture of air and methanol is preheated in preheater 5 to a temperature of between about 100° and about 200° C. and passed to oxidizer 6.

Oxidizer 6 is an approximately adiabatic reactor provided with a fixed bed of a silver catalyst supported on Alundum, in contact with which reaction between the air and methanol occurs to produce formaldehyde; oxidation of mixtures containing air and methanol in the ratios above specified proceeds without development of temperatures in excess of 700° C., the highest temperatures attained in the oxidizer being between about 550° and about 650° C.

The gases emerging from oxidizer 6 are generally at a temperature between about 500° and about 570° C. In accordance with my invention such gases are cooled to a temperature between about 125° and about 300° C. in cooler 7. Additional air from blower 4 is then admixed with the cooled gases. The amount of additional air thus added should be such that the mol ratio of total oxygen employed to methanol is between about 0.30 and about 0.50; accordingly an amount of air should be admixed with the gases such that the mol ratio of total air employed to methanol amounts to between about 1.4 and about 2.4.

After addition of auxiliary air, the gases are passed to oxidizer 8, of the same general construction as oxidizer 6, in which further oxidation of methanol to formaldehyde occurs; by operating under the conditions above specified temperatures above 700° C. are avoided in this oxidizer also. The gases from oxidizer 8 are cooled in cooler 9 to between about 150° and about 200° C. and the cooled gases are passed to recovery column 10.

In operation of the process as above described use of space velocities in each reactor of from 10,000 to 100,000 volumes of gas per volume of catalyst per hour have been found suitable; the methanol throughput may vary between 40 and 300 lbs. of methanol per hour per square foot of catalyst cross sectional area for catalyst beds of 0.5 to 6.0 inches in depth. Under these conditions and by operating as described percent attacks on the methanol of the order of 70% to 94% with efficiencies of 85% to 95% are attained. The products of this invention contain formaldehyde and unreacted methanol in the ratio of about 4:1 and are suitable for immediate scrubbing to recover formaldehyde as Formalin solution without subsequent removal of unreacted methanol for recycling.

The gases from cooler 9 are then introduced into the base of recovery column 10. As shown, this column may be a plate type column divided into a condenser scrubber section and a final scrubber section. The gases pass upwardly through column 10 in countercurrent contact with a descending stream of an aqueous formaldehyde solution introduced, as shown, at approximately the midpoint of the column, whereby the formaldehyde and methanol in the reaction gases are absorbed, producing a product which is acceptable as a commercial Formalin solution. The solution thus obtained is withdrawn to sump 11, thence pumped by means of pump 12 to cooler 13 to remove heat of solution and recycled to the midpoint of column 10; a portion of the recycled solution is withdrawn to tank 14 as product. In the upper portion of column 10 the unabsorbed gases are scrubbed with water introduced, as shown, at the top of the column to recover unabsorbed formaldehyde and methanol, unabsorbed gases being vented to a suitable stack.

The following examples are illustrative of my invention:

*Example 1.*—A mixture of methanol vapors and air, in which the mol ratio of air to methanol was 1.21, was preheated to a temperature of about 120° C. and introduced into an insulated silica tube 45 cm. in length and 1.7 cm. in diameter containing a bed of a 2.97% silver catalyst supported on Alundum, the depth of the catalyst bed being 1.25" and the space velocity of the mixture through the reactor being 21,000 reciprocal hours. In this reactor oxidation of methanol to formaldehyde occurred; it was found the highest temperature attained in the reactor was 610° C. The gases from the reactor were then withdrawn to a cooler, wherein they were cooled to a temperature of about 150° C. Additional air was added to the cooled gases in amounts such that the mol ratio of total air used to methanol amounted to 1.68. The cooled, fortified gases containing the additional air were then passed to a second insulated reactor of the same dimensions as the one above described containing the same amount of the same silver catalyst. Further oxidation occurred, the highest temperature attained being 610° C. The gases withdrawn from the second reactor were analyzed. It was found that 82.5% of the methanol had been attacked, and that 93% of the methanol attacked had been converted to formaldehyde; the non-condensable gases contained only 3.3% carbon dioxide by volume and no carbon monoxide.

*Example 2.*—A mixture of air and methanol in which the mol ratio of air to methanol was 1.21 was preheated to a temperature of 120° C. and introduced into an insulated silica tube of the same dimensions as that employed in Example 1 containing the same amount of the same silver catalyst, the space velocity of the mixture through the reactor being 21,000 reciprocal hours. In the reactor oxidation of methanol to formaldehyde occurred, with the highest temperature attained being 594° C. The gases from the reactor were then cooled to a temperature of about 150° C. and admixed with additional air in amount such that the mol ratio of total air employed to methanol amounted to 2.12. These gases were then passed through a second silica reactor of the same dimensions as the first reactor and containing the same amount of the same silver catalyst. In the second reactor further oxidation of methanol to formaldehyde occurred, the highest temperature attained being 602° C. The gases from the second reactor were analyzed. It was found 94% of the methanol had been attacked and that 91% of the methanol attacked had been converted to formaldehyde; the non-condensable gases contained only 4.3% carbon dioxide and no carbon monoxide.

The following illustrated the importance of the intermediate cooling step of my invention.

In this example a mixture of air and methanol in which the mol ratio of air to methanol was 1.03 was preheated to a temperature of 120° C. and passed into a heated glass tube of the same dimensions as that employed in the preceding examples and containing a bed of 3.36% silver catalyst supported on Alundum of 1.25" depth, the space velocity being 17,200 reciprocal hours. In this bed, oxidation of methanol to formaldehyde occurred, the maximum temperature attained being 616° C. With no intermediate cooling, additional air was then added to the reaction gases from the first bed in amounts such that the mol ratio of total air employed to methanol amounted to 1.85 and the thus fortified gas was then passed to a second bed of catalyst of the same dimensions and containing the same amount of the same silver catalyst as in the first bed. In this bed further oxidation of methanol to formaldehyde occurred, the maximum temperature attained being 600° C. The gases were then analyzed. It was found that only 65.4% of the methanol was attacked, and of this amount only 76.8% was converted to formaldehyde; this should be contrasted with the 82.5% and 94% attacks and 91.0% to 93.0% efficiencies obtained in the previous examples. Furthermore, the non-condensable reaction gas contained 5.6% carbon dioxide and 2.7% carbon monoxide.

Since certain changes may be made in carrying out the above process without departing from the scope of the invention, it is intended that all matter contained in the above description shall be interpreted as illustrative and not in a limiting sense. Thus more than two reactors in series may be utilized, the reaction gases being cooled and fortified with air between the reactors as above described; when using more than two reactors in series, the extent of the reactions and accordingly the temperature rise in each reactor would be less than above described, so that correspondingly less cooling between reactors would be required.

I claim:

1. In the catalytic oxidation of methanol to formaldehyde, the improvements which comprise passing a vapor mixture of methanol and an oxygen-containing gas, in which the mol ratio of oxygen to methanol does not exceed 0.26, into an adiabatic reactor, whereby oxidation of methanol to formaldehyde occurs without development of a temperature in excess of 700° C., cooling the gases emerging from said reactor to a temperature between about 125° and about 300° C., admixing the cooled gases with additional oxygen-containing gas in amounts such that the mol ratio of total oxygen employed to methanol amounts to between about 0.30 and about 0.50 and passing the said gases into a second adiabatic reactor, wherein further oxidation of methanol to formaldehyde occurs without the development of temperatures in excess of 700° C.

2. In the catalytic oxidation of methanol to formaldehyde, employing a silver catalyst, the improvements which comprise passing a vapor mixture of methanol and an oxygen-containing gas in which the mol ratio of oxygen to methanol does not exceed 0.26, into the first of two adiabatic reactors in which reactor is disposed a bed of silver catalyst, whereby oxidation of methanol to formaldehyde occurs without development of a temperature in excess of 700° C., cooling the gases emerging from said reactor to a temperature between about 125° and about 300° C., admixing the cooled gases with additional oxygen-containing gas in amounts such that the mol ratio of total oxygen employed to methanol amounts to between about 0.30 and about 0.50, and passing the said gases into the second adiabatic reactor in which is disposed a bed of silver catalyst, wherein further oxidation of methanol to formaldehyde occurs without the development of temperatures in excess of 700° C.

3. In the catalytic oxidation of methanol to formaldehyde, the improvements which comprise passing a vapor mixture of methanol and an oxygen-containing gas, in which the mol ratio of oxygen to methanol does not exceed 0.26, into the first of two adiabatic reactors, whereby oxidation of methanol to formaldehyde occurs without development of a temperature in excess of 700° C., cooling the gases emerging from said reactor to a temperature between about 125° and about 300° C., admixing the cooled gases with additional oxygen-containing gas in amounts such that the mol ratio of total oxygen employed to methanol amounts to between about 0.30 and about 0.50, passing the said gases into the second adiabatic reactor, wherein further oxidation of methanol to formaldehyde occurs without the development of temperatures in excess of 700° C., withdrawing reaction gases from said second reactor and scrubbing said gases with an aqueous medium to recover the formaldehyde therefrom.

4. In the catalytic oxidation of methanol to formaldehyde employing a silver catalyst, the improvements which comprise preheating a vapor mixture of air and methanol, in which the mol ratio of air to methanol is between 0.7 and 1.25, to a temperature between 100° and 200° C., passing the mixture into the first of two adiabatic reactors, in which reactor is disposed a bed of supported silver catalyst, at a space velocity between 10,000 and 100,000 reciprocal hours, whereby oxidation of methanol to formaldehyde occurs without development of a temperature in excess of 700° C., cooling the gases emerging from said reactor to a temperature between about 125° and about 300° C., admixing the cooled gases with additional air in amounts such that the mol ratio of total air employed to methanol amounts to between about 1.4 and about 2.4, passing the said gases into the second adiabatic reactor in which is disposed a bed of supported silver catalyst, wherein further oxidation of methanol to formaldehyde occurs without the development of temperatures in excess of 700° C., withdrawing reaction gases from said second reactor and scrubbing said gases with an aqueous medium to remove the formaldehyde.

5. In the catalytic oxidation of methanol to formaldehyde by means of an oxygen-containing gas in contact with a methanol oxidation catalyst at elevated temperatures, the improvements which comprise passing a vapor mixture of methanol and the oxygen-containing gas, in which the mol ratio of gas to methanol is between 0.7 and 1.25 and the mol ratio of oxygen to methanol does not exceed 0.26, into an adiabatic reactor containing the methanol oxidation catalyst, whereby oxidation of methanol to formaldehyde occurs without development of a temperature in excess of 700° C., cooling the vapor mixture emerging from said reactor to a temperature between about 125° and about 300° C., mixing the cooled vapor mixture with additional oxygen-containing gas in amount such that the mol ratio of total oxygen-containing gas to methanol amounts to between about 1.4 and about 2.4 and the mol ratio of total oxygen to methanol amounts to between about 0.30 and about 0.50, and passing the resulting mixture into a second adiabatic reactor containing the methanol oxidation catalyst, whereby further oxidation of methanol to formaldehyde occurs without the development of temperatures in excess of 700° C.

WILLIAM B. MEATH.

REFERENCES CITED

The following references are of record in the file of this patent:

UNITED STATES PATENTS

| Number | Name | Date |
| --- | --- | --- |
| 1,968,552 | Bond et al. | July 31, 1934 |
| 1,975,853 | Lazier | Oct. 9, 1934 |
| 2,083,877 | Steck et al. | June 15, 1937 |
| 2,111,584 | Eversole | Mar. 22, 1938 |
| 2,249,847 | Murray | July 22, 1941 |